(12) United States Patent
Wilczek et al.

(10) Patent No.: US 11,900,478 B2
(45) Date of Patent: *Feb. 13, 2024

(54) DIGITALLY CROSS-REFERENCING COMMUNITY TRANSACTION DATA TO DETERMINE COMMODITY TYPES AND AUTOMATICALLY ASSIGN TAX CODES TO AN INVOICE

(71) Applicant: COUPA SOFTWARE INCORPORATED, San Mateo, CA (US)

(72) Inventors: Donna Wilczek, Sonoma, CA (US); Markus Hornburg, Jesteburg (DE); Zachary Randles, Rocklin, CA (US); Lucy Ashdown, London (GB)

(73) Assignee: Coupa Software Incorporated, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/957,324

(22) Filed: Sep. 30, 2022

(65) Prior Publication Data

US 2023/0021865 A1  Jan. 26, 2023

Related U.S. Application Data

(63) Continuation of application No. 17/321,878, filed on May 17, 2021, now Pat. No. 11,488,261, which is a continuation of application No. 16/450,849, filed on Jun. 24, 2019, now Pat. No. 11,049,191.

(60) Provisional application No. 62/690,749, filed on Jun. 27, 2018.

(51) Int. Cl.
 *G06Q 40/12* (2023.01)
 *G06Q 30/08* (2012.01)

(52) U.S. Cl.
 CPC .................. *G06Q 40/123* (2013.12)

(58) Field of Classification Search
 CPC .................................... G06Q 40/123
 USPC ........................................... 705/31
 See application file for complete search history.

(56) References Cited

U.S. PATENT DOCUMENTS

| | | | |
|---|---|---|---|
| 7,925,568 B2* | 4/2011 | Cullen, III | G06Q 30/08 705/37 |
| 10,896,430 B1* | 1/2021 | Harris | G06Q 30/0635 |
| 2018/0012268 A1* | 1/2018 | Simantov | G06F 16/93 |

* cited by examiner

Primary Examiner — Garcia Ade
(74) Attorney, Agent, or Firm — Baker Botts L.L.P.

(57) ABSTRACT

A computer-implemented method comprising receiving a set of rules that define assigning tax codes for a first entity based on a plurality of parameters; receiving invoice data that defines an invoice directed to the first entity; automatically determining a commodity type applicable to the invoice data by digitally cross-referencing line items in the invoice data representing goods or services to community transaction data, the community transaction data comprising a plurality of different line item data for different invoices of other entities different from and unrelated to the first entity; automatically assigning tax codes to the invoice data based on the commodity type and the set of rules; and causing to display the commodity type and the tax codes in a graphical user interface.

20 Claims, 7 Drawing Sheets

302 RECEIVING, AT A CODING COMPUTER, A SET OF COMPUTER-EXECUTABLE RULES THAT DEFINE ASSIGNING ONE OR MORE TAX CODES FOR A FIRST ENTITY BASED ON A PLURALITY OF PARAMETERS, AND ELECTRONICALLY STORING THE SET OF RULES IN A FIRST DIGITAL DATA REPOSITORY IN ASSOCIATION WITH AN ENTITY RECORD OF THE FIRST ENTITY

304 RECEIVING, AT THE CODING COMPUTER, DIGITAL INVOICE DATA THAT DEFINES AN ELECTRONIC PAYMENT INVOICE DIRECTED TO THE FIRST ENTITY

306 USING THE CODING COMPUTER, AUTOMATICALLY DETERMINING A COMMODITY TYPE APPLICABLE TO THE INVOICE DATA BY DIGITALLY CROSS-REFERENCING LINE ITEMS IN THE INVOICE DATA REPRESENTING GOODS OR SERVICES TO COMMUNITY TRANSACTION DATA STORED IN A SECOND DIGITAL DATA REPOSITORY, THE COMMUNITY TRANSACTION DATA COMPRISING A PLURALITY OF DIFFERENT DIGITAL LINE ITEM DATA FOR DIFFERENT DIGITAL INVOICES OF A PLURALITY OF OTHER ENTITIES DIFFERENT FROM AND UNRELATED TO THE FIRST ENTITY

308 USING THE CODING COMPUTER, AUTOMATICALLY ASSIGNING ONE OR MORE TAX CODES TO THE INVOICE DATA BASED ON THE COMMODITY TYPE AND THE SET OF COMPUTER-EXECUTABLE RULES THAT ARE STORED IN THE FIRST DIGITAL DATA REPOSITORY IN ASSOCIATION WITH THE ENTITY RECORD

310 CAUSING TO DISPLAY THE COMMODITY TYPE AND THE ONE OR MORE TAX CODES IN A GRAPHICAL USER INTERFACE

FIG. 4

Tax Code Rules

| ID | Chart of Account | Tax Code | Status | Actions |
|---|---|---|---|---|
| TX Code 01 | COA 01 | FR-45 | Active | ○ |
| TX Code 02 | COA 01 | FR-46 | Active | ○ |
| TX Code 03 | COA 01 | FR-47 | Active | ○ |
| TX Code 04 | COA 01 | BE-01 | Active | ○ |
| TX Code 05 | COA 01 | BE-02 | Active | ○ |
| TX Code 06 | COA 01 | DE-10 | Active | ○ |
| TX Code 07 | COA 02 | DE-11 | Active | ○ |
| TX Code 08 | COA 02 | DE-12 | Active | ○ |
| TX Code 09 | COA 02 | DE-13 | Active | ○ |
| TX Code 10 | COA 02 | DE-14 | Active | ○ |
| TX Code 11 | COA 02 | DE-15 | Active | ○ |
| TX Code 12 | COA 03 | GB-01 | Active | ○ |
| TX Code 13 | COA 03 | GB-02 | Active | ○ |
| TX Code 14 | COA 03 | GB-03 | Active | ○ |
| TX Code 15 | COA 03 | GB-04 | Active | ○ |

FIG. 5

⌂ Expenses Requests Orders Invoices Inventory Sourcing Suppliers Contracts Reports [Setup]

Error Loading Tax Code Rules
We encountered 02 errors while attempting to load file

[Export to ▼]  View [All ▼]  [Advanced] [Search 🔍]

| Location | Field | Your Value | Error |
|---|---|---|---|
| Row 2 | Chart of Account | | Chart of account missing |
| Row 2 | Chart of Account | COA 01 | Chart of Account COA 01 |
| Row 1 | Type | | Type of invoice missing |
| Row 7 | Tax Code | FR-47 | Tax Code FR-47 is inactive |
| Row 7 | Tax Code | FR-47 | Tax Code FR-47 is inactive |
| Row 7 | Tax Code | FR-47 | Tax Code FR-47 is inactive |
| Row 7 | Tax Code | FR-47 | Tax Code FR-47 is inactive |
| Row 7 | Tax Code | FR-47 | Tax Code FR-47 is inactive |
| Row 7 | Tax Code | FR-47 | Tax Code FR-47 is inactive |
| Row 7 | Tax Code | FR-47 | Tax Code FR-47 is inactive |
| Row 7 | Tax Code | FR-47 | Tax Code FR-47 is inactive |
| Row 7 | Tax Code | GB-04 | Tax Code GB-04 could not be found |

Per page 15 45 90    Prev 1 2 Next  [Back]

DIGITALLY CROSS-REFERENCING COMMUNITY TRANSACTION DATA TO DETERMINE COMMODITY TYPES AND AUTOMATICALLY ASSIGN TAX CODES TO AN INVOICE

BENEFIT CLAIM

This application is a continuation of U.S. application Ser. No. 17/321,878, filed May 17, 2021, which is a continuation of U.S. application Ser. No. 16/450,849, filed Jun. 24, 2019, which claims the benefit under 35 U.S.C. § 119(e) of provisional application 62/690,749, filed Jun. 27, 2018, the entire contents of which is hereby incorporated by reference.

FIELD OF THE DISCLOSURE

One technical field of the present disclosure is computer-implemented e-procurement systems that process digital electronic purchase requisitions, purchase orders and invoices using multi-tenant database systems, enforcement of data-defined computer processing workflows, automatic calculations of data based on input and automatic notifications and alerts. The present disclosure also relates to managing data relating to invoices in computer systems and, more specifically, to providing automated assignments of digital representations of tax codes based on machine interpretation of invoice data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Business entities, such as companies, schools, hospitals, and government agencies typically have sophisticated computer systems for managing their financial accounts. These account management tools are used among a variety of businesses in various industries, revenues, and number of employees. The entities may have accounts receivable (AR) and accounts payable (AP) departments that are in charge of invoicing and payments, respectively. These departments use technology tools to manage these accounts in a timely and accurate manner. The systems are supported by large digital databases, typically relational databases, storing data for orders, invoices and payments as well as stored procedures that are capable of computer execution to automatically transform stored digital values using calculations, filters or other transformations.

The technology tools used by these entities have a number of different settings and configurations that are entity-specific. The settings and configurations may drive workflow processes for the entity and unintentionally create inefficiencies that slow down or halt invoicing and payments for the entity. One such inefficiency is incorrect or missing tax codes in invoices. In prior approaches, administrators would send repeated communications to gather the necessary information and confirm certain tax and business statuses in order to assign correct invoice tax codes. This previous method resulted in the wasteful use of computer processing resources, such as CPU usage and memory, as well as network bandwidth.

Therefore, there is a need to improve identification and assignment of proper tax codes for invoices to decrease the excessive use of computer processing resources and network bandwidth.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections according to the following outline:

1.0 GENERAL OVERVIEW
2.0 STRUCTURAL OVERVIEW
3.0 FUNCTIONAL OVERVIEW
4.0 PROCEDURAL OVERVIEW
5.0 HARDWARE OVERVIEW 1.0 General Overview Procurement control systems allow entities to reduce the consumption of data processing resources involved in the purchasing processes by automating the assignment of tax codes. This disclosure focuses on technical improvements in such procurement control systems. In one embodiment, a procurement control system implemented as an online, networked Software-as-a-Service (SaaS) system is disclosed. The procurement control system may be implemented using a virtualized data center that hosts or executes a plurality of instances of the system, to which multiple different entities or tenants connect. A shared multi-tenant database may be accessible to the procurement control system for purposes of secure storage of different data of unrelated or competing entities or tenants.

In an embodiment, the procurement control system may automatically identify and assign invoice tax codes in a touchless end-to-end process. Particular tax codes may be recommended or assigned based on factors such as a supplier tax country, a buyer tax country, an invoice origination country, a billing destination country, a commodity type, and a deductibility type, among other factors. The commodity type may, in turn, be automatically derived using other invoice data and community data gathered on all suppliers and buyers.

In an embodiment, a computer-implement method for improving computer processing efficiency comprises receiving, at a coding computer, a set of computer-executable rules that define assigning one or more tax codes for a first entity based on a plurality of parameters, and electronically storing the set of rules in a first digital data repository in association with an entity record of the first entity. The method further comprises receiving, at the coding computer, digital invoice data that defines an electronic payment invoice directed to the first entity. The method further comprises using the coding computer, automatically determining a commodity type applicable to the invoice data by digitally cross-referencing line items in the invoice data representing goods or services to community transaction data stored in a second digital data repository, the community transaction data comprising a plurality of different digital line item data for different digital invoices of a plurality of other entities different from and unrelated to the first entity. The method further comprises, using the coding computer, automatically assigning one or more tax codes to the invoice data based on the commodity type and the set of computer-executable rules that are stored in the first digital data repository in association with the entity record. The method further comprises causing to display the commodity type and the one or more tax codes in a graphical user interface.

In another embodiment, a computer-implement method for improving computer processing efficiency comprises receiving a set of rules for assigning one or more tax codes for an entity based on a plurality of parameters and saving the set of rules in a first data repository in association with an entity record for the entity. The method further comprises receiving an invoice for the entity wherein the invoice comprises invoice data. The method further comprises determining a commodity type for the invoice by cross referencing the invoice data with community data stored in a second data repository. The method further comprises automatically assigning one or more tax codes to the invoice using the commodity type and the set of rules stored in the first data repository in association with the entity record and causing to display the one or more tax codes in a graphical user interface.

In another embodiment, a computer system comprises one or more processors and one or more memories communicatively coupled to the one or more processors and storing instructions which, when processed by the one or more processors of a server computing device, cause: receiving a document comprising a set of rules for assigning one or more tax codes for an entity based on a plurality of parameters and saving the document in a first data repository in association with an entity record for the entity; receiving an invoice for the entity wherein the invoice comprises invoice data; determining a commodity type for the invoice by cross referencing the invoice data with community supplier data stored in a second data repository; and automatically assigning one or more tax codes to the invoice using the commodity type and the document stored in the first data repository in association with the entity record and causing to display the one or more tax codes in a graphical user interface.

The embodiments of the invention disclosed herein address the technical problem of how to eliminate or reduce repeated or needless electronic communications that are otherwise required to solicit or receive necessary data and confirm certain tax and business data to assign correct invoice tax codes. Specific problems of prior practice have included wasteful use of computer processing resources, such as CPU usage and memory, as well as network bandwidth. The solutions disclosed herein can improve identification and assignment of proper tax codes for invoices to decrease the excessive use of computer processing resources and network bandwidth. Consequently, the procurement control system described herein provides numerous technical benefits. One example is reduced use of memory, CPU cycles, and other computer resources, resulting in improved machine efficiency. With the current approach, networked computers connected to a procurement control system use fewer network messages, buffer memory, CPU cycles and other resources that would otherwise be used to repeatedly correct procurement invoices. In an embodiment, a procurement control system utilized aggregate data that has been collected from a plurality of different entities to automatically determine tax codes.

1.0 Structural Overview

Figure 1:
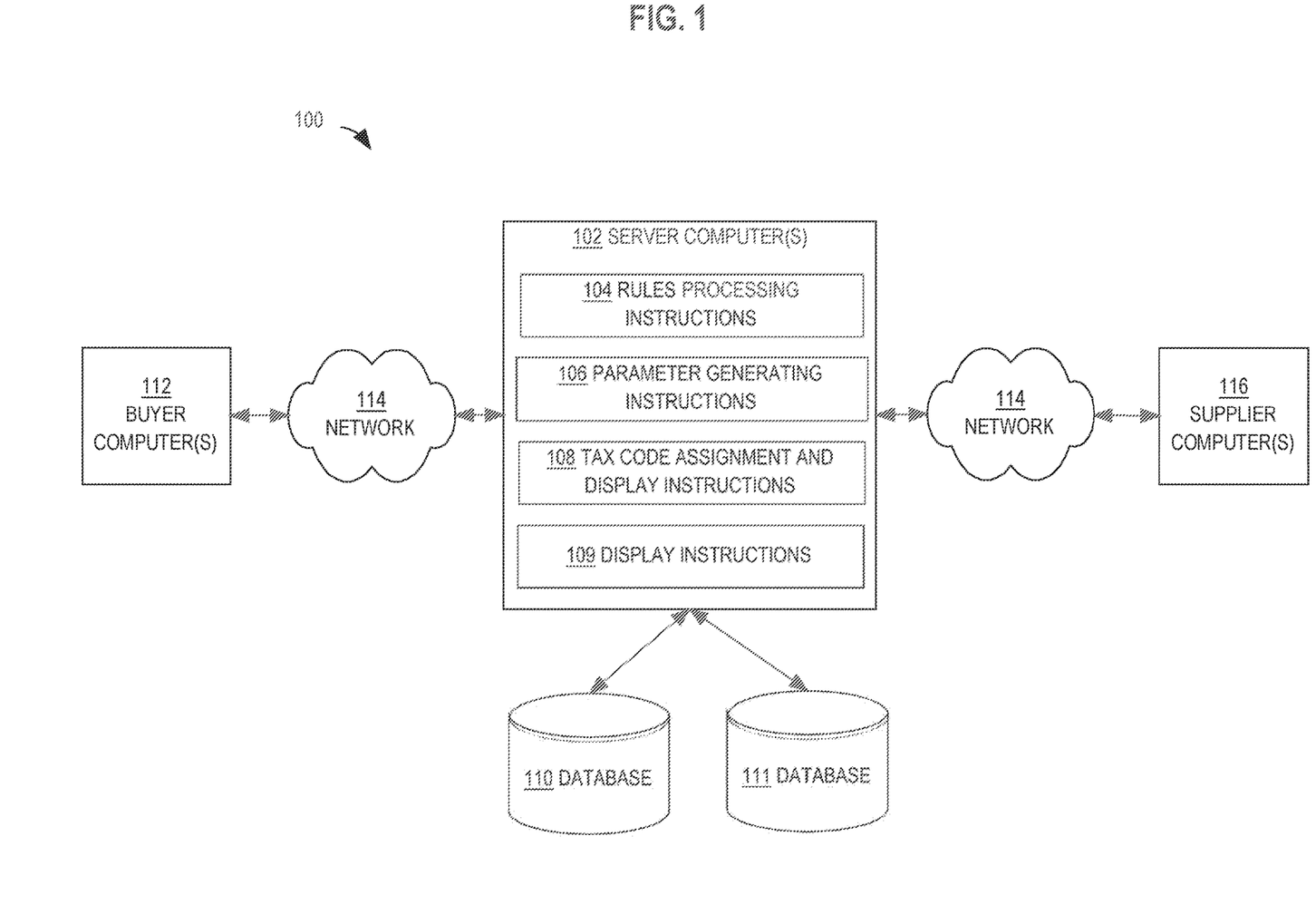
FIG. 1 illustrates a networked computer system, in an example embodiment.

FIG. 1 is a block diagram of an example computer network system in which various embodiments may be practiced. In an embodiment, a computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, docker containers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by computer(s).

FIG. 1 illustrates only one of many possible arrangements of components configured to execute the programming described herein. Other arrangements may include fewer or different components, and the division of work between the components may vary depending on the arrangement. In the example of FIG. 1, a networked computer system 100 may facilitate the exchange of data between server computer(s)

102, buyer computer(s) 112, and supplier computer(s) 116. Therefore, each of elements 102, 112, and 116 of FIG. 1 may represent one or more computers that host or execute stored programs that provide the functions and operations that are described further herein in connection with procurement services. The methods and systems describe herein may be designed to accommodate a variety of different enterprises.

In an embodiment, a networked computer system 100 comprises server computer(s) 102, buyer computer(s) 112, and supplier computer(s) 116, which are communicatively coupled directly or indirectly via network 114.

Server computer 102 may be implemented using a server-class computer or other computers having one or more processor cores, co-processors, or other computers. Server computer 102 may be a computer, software and/or hardware or a combination storing instructions that are programmed or configured to store, process, analyze, and send transaction data in order to generate recommendations. The server computer 102 may additionally receive information that is not specific to individual transactions, such as public contact information of suppliers, website URLs for suppliers, and catalogue information for suppliers.

In an embodiment, the server computer 102 executes, in association with a procurement system, rules processing instructions 104, parameter generating instructions 106, tax code assignment instructions 108, and display instructions 109, the functions of which are described in other sections herein. The rules processing instructions 104, parameter generating instructions 106, tax code assignment instructions 108, and display instructions 109 may be computer instructions installed separately from or as a part of the procurement system, as a module or a plug-in to supplement features of the procurement system, as a separate instance of executing code on the server computer 102 than an instance of code of the procurement system, or any other arrangement depending on the needs of the buyer or supplier entity.

The rules processing instructions 104 may cause the server computer 102 to receive, process, and save a set of computer-executable rules. For example, rules processing instructions 104 may cause receiving an XML document or file, "Yet Another Markup Language" (YAML) file, JavaScript Object Notation (JSON) file, a MessagePack file, Comma Separated Values (CSV) file, or any other file featuring a set of rules that define how tax codes are assigned to an entity based on a variety of parameters. The rules processing instructions 104 may also be used for implementing aspects of the flow diagrams that are further described herein. For example, the rules processing instructions 104 may also be configured to generate or update an entity record belonging to an entity.

The parameter generating instructions 106 may cause the server computer 102 to receive an invoice featuring invoice data from one or more entities, cross-reference line items in the invoice data to community transaction data, and determine a commodity type, deductibility type, or any other features that are applicable to the invoice. In an embodiment, the parameter generating instructions 106 may cause the server computer 102 to receive and evaluate the contents of an invoice to determine invoice features, such as line items in the invoice data representing goods or services. Parameter generating instructions 106 may then use the cross-referencing techniques to determine a commodity type, deductibility type, or any other features that are applicable to the invoice. For example, the parameter generating instructions 106 may cause the server computer 102 to cross-reference or match the line items to existing community transaction data in order to determine applicable features. Cross-referencing may be exact matching, fuzzy matching, multiple different queries with various wildcard substitution, a trained decision tree, or any other matching techniques. In an embodiment, any type of machine learning algorithm may be used as part of the parameter generating instructions 106. Parameter generating instructions 106 may also be used for implementing aspects of the flow diagrams that are further described herein.

The tax code assignment instructions 108 may cause the server computer 102 to automatically assign tax codes to the invoice based on the rules processed by the rules processing instructions 104 and the commodity type, deductibility type, and/or any other features generated by the parameter generating instructions 106. The display instructions 109 may cause the server computer 102, buyer computer 112, and/or supplier computer 116 to display the tax code, as well as any generated features such as the commodity type and/or deductibility type.

The server computer 102 may be associated with database 110, 111. Database 110 may store a set of computer-executable rules that define assigning one or more tax codes based on a plurality of parameters. The rules may be stored in database 110 in association with an entity record. For example, rules that pertain to a buyer entity will be stored in association with a buyer entity record in database 110. Rules that pertain to a supplier entity will be stored in association with a supplier entity record in database 110.

Database 111 may store community data related to one or more supplier and/or buyer entities, such as present and historical transaction data and entity profile details on the supplier and/or buyer entities. For example, database 111 may store past and present line item invoice data from one or more transactions between supplier entities and buyer entities. In an embodiment, the database 111 may include digital line item data for different digital invoices of any number of different supplier and/or buyer entities. The community transaction data may be used as a training dataset in machine learning algorithms, as further described herein. Additional computing elements, code or other functional elements that are not shown in FIG. 1 may be provided in association with the server computer 102.

Network 114 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 140 and the disclosure presumes that all elements of FIG. 1 are communicatively coupled via network 114. The various elements depicted in FIG. 1 may also communicate with each other via direct communications links that are not depicted in FIG. 1 for purposes of explanation.

The server computer 102 is accessible over network 114 by multiple computing devices, such as a buyer computer 112 or a supplier computer 116. Any other number of buyer computers 112 or supplier computers 116 may be registered with the server computer 102 at any given time. Thus, the elements in FIG. 1 are intended to represent one workable embodiment but are not intended to constrain or limit the number of elements that could be used in other embodiments.

The computing devices such as the buyer computer 112 and supplier computer 116 may comprise a desktop computer, laptop computer, tablet computer, smartphone, or any other type of computing device that allows access to the server 102. The buyer computer 112 may be associated with one or more buyers. The supplier computer 116 may be associated with one or more suppliers.

3.0 Functional Overview

Figure 2:
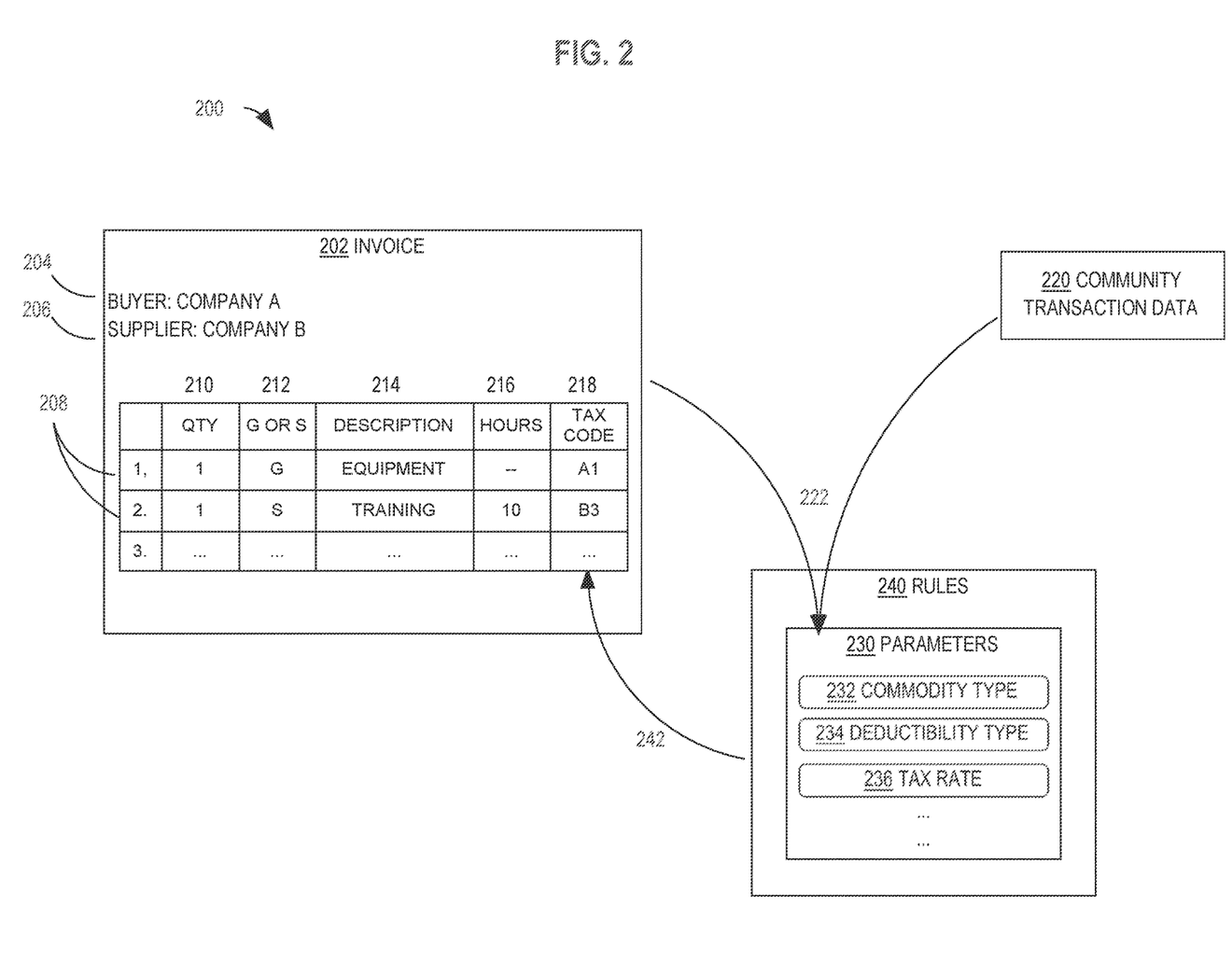
FIG. 2 illustrates server computer processes or algorithms, in an example embodiment.

FIG. 2 illustrates server computer processes or algorithms 200, in an example embodiment. Server computer 102 may utilize a procurement system that is configured to onboarding customers, process invoice, and automatically assign tax codes to invoices by obtaining and processing supplier and/or buyer data, in an example embodiment.

For purposes of illustrating a clear example, FIG. 2 is described herein in the context of FIG. 1, but the broad principles of FIG. 2 can be applied to other systems having configurations other than as shown in FIG. 1. Further, FIG. 2 and each other diagram herein illustrates an algorithm or plan that may be used as a basis for programming one or more of the functional modules of FIG. 1 that relate to the functions that are illustrated in the diagram, using a programming development environment or programming language that is deemed suitable for the task. Thus, FIG. 2 and each other diagram herein are intended as an illustration at the functional level at which skilled persons, in the art to which this disclosure pertains, communicate with one another to describe and implement algorithms using programming.

The buyer computer 112 and/or supplier computer 116 may send the server computer 102 a set of rules 240 that govern the assignment of tax code(s) 218 in relation to an invoice 202. The rules 240 may be, for example, a series of algorithms that determine a variety of features for tax code assignment automation based on parameters 230. In an embodiment, the features may be, for example, invoice headers, jurisdictions, invoice lines, tax lines, or any other feature, as further discussed herein. In an embodiment, one or more parameters 230 for the features may be provided by the buyer entity and/or supplier entity. In another embodiment, one or more parameters 230 for the features may be automatically generated or determined by the server computer 102 using invoice 202 data and community transaction data 220, as indicated by arrows 222 of FIG. 2. In an embodiment, the rules 240 may be saved in an XML, document or file, "Yet Another Markup Language" (YAML) file, JavaScript Object Notation (JSON) file, a MessagePack file, a Comma Separated Values (CSV) file, or any other type of file, and sent to the server computer 102.

In an embodiment, an invoice header feature may include one or more values representing tax registration information, such as a supplier's country's fiscal representative tax registration or a buyer's country's fiscal representative tax registration.

In an embodiment, a jurisdiction feature may include one or more values representing a relevant tax jurisdiction value based on location, such as a domestic jurisdiction, crossborder jurisdiction, intra-European Union jurisdiction, or any other jurisdiction. The jurisdiction may be determined based on a variety of parameters 230, such as values for a supplier's tax country, the buyer's tax country, the supplier invoice country, the bill destination country, the shipping origin country, the shipping destination country, whether the supplier tax country is in a European Union country, whether the buyer tax country is in a European Union country, whether the supplier invoice is from a European Union country, whether the bill destination country is a European Union country, whether the shipping origin country is a European Union country, whether the shipping destination country is a European Union country, or any other parameters.

In an embodiment, an invoice line feature may include one or more values representing invoice details for one or more commodities. An invoice line feature may include line item or commodity types, deductible line types, tax rates, account or cost-center, or any other relevant invoice information as parameters 230. In an embodiment, an invoice line feature may be determined by the buyer entity or supplier entity. In another embodiment, the invoice line feature may be determined by the server computer 102, as further discussed herein.

In an embodiment, a line item type may be, for example, values that represent goods, services, service exceptions, raw materials, investments goods, or any other commodity type 232. In an embodiment, the line item or commodity type 232 may be determined by the server computer 102 using community transaction data 220, as indicated by arrows 222 of FIG. 2. The commodity type 232 may subsequently be used in conjunction with other rules 240 to automatically assign a tax code 218, as indicated by arrow 242 of FIG. 2. A deductible line type may be partial deductibility, full deductibility, non-deductibility, or any other deductibility type 234. In an embodiment, the deductibility type 234 may be determined by the server computer 102 using community transaction data 220, as indicated by arrows 222 of FIG. 2. The deductibility type 234 may subsequently be used in conjunction with other rules 240 to automatically assign a tax code 218, as indicated by arrow 242 of FIG. 2. A tax rate 236 may be a specific rate at which a commodity is taxed. In an embodiment, the tax rate 236 may be determined by the server computer 102 using community transaction data 220, as indicated by arrows 22 of FIG. 2. The tax rate 236 may subsequently be used in conjunction with other rules 240 to automatically assign a tax code 218, as indicated by arrow 242 of FIG. 2. An account or cost-center may be a particular account department specific to a buyer entity or a supplier entity. In an embodiment, the account or cost-center may be determined using the server computer 102 using community transaction data 220, as indicated by arrows 222 of FIG. 2. The account or cost-center may subsequently be used in conjunction with other rules 240 to automatically assign a tax code 218, as indicated by arrow 242 of FIG. 2.

In an embodiment, a tax line feature may include one or more values representing tax information, such as a tax rate type, a tax line type, a tax reference, or any other tax information.

A server computer 102 may also receive an invoice 202. The invoice 202 may feature values that represent a buyer entity 204 and a supplier entity 206. The invoice 202 may also feature values for purchase line items 208 that include a quantity 210, a goods or services category 212, an item description 214 of goods or services, a number of hours 216 for services, and the tax code 218 for the goods or services. While not depicted in FIG. 2, any number of other types of values may also be featured in the invoice 202 in association with purchase line items 208. In the example of FIG. 2, a first purchase line item 208 corresponds to a quantity 210 value of one, a goods or services category 212 value of "G" to represent goods, an item description 214 value of "EQUIPMENT," and a tax code 218 value of A1. A second purchase line item 208 corresponds to a quantity 210 value of one, a goods or services category 212 value of "S" to represent services, an item description 214 value of "TRAINING," and a tax code 218 value of B3. The values depicted in FIG. 2 are example only and are not intended to be limiting. For example, the goods or services category 212 may feature subcategories that further define particular goods or services.

4.0 Procedural Overview

Figure 3:
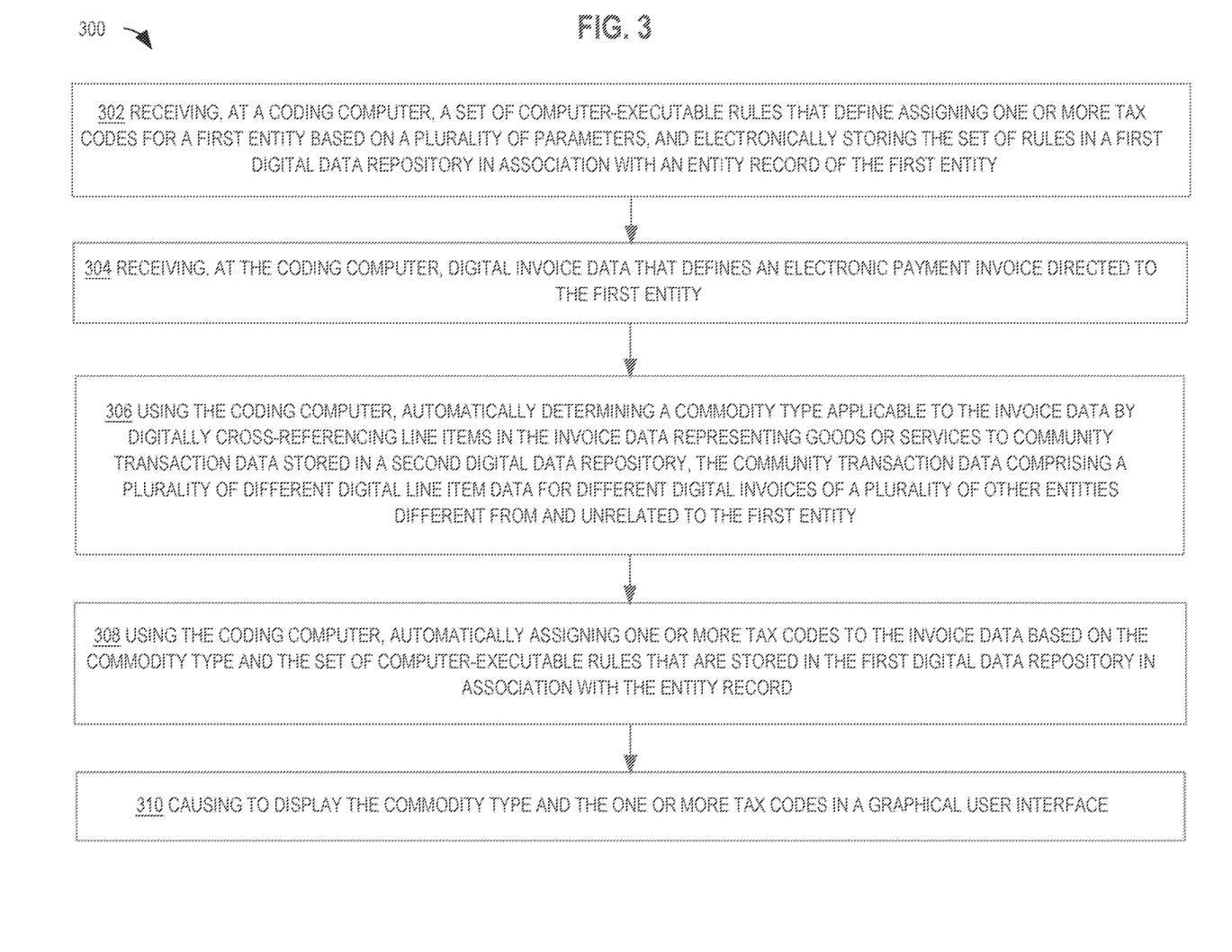
FIG. 3 illustrates an algorithm or method for automating tax code assignment, in an example embodiment.

FIG. 3 illustrates an algorithm or method 300 for automating tax code assignment, in an example embodiment. For purposes of illustrating a clear example, FIG. 3 is described herein in the context of FIG. 1 and FIG. 2, but the broad principles of FIG. 3 can be applied to other systems having configurations other than as shown in FIG. 1 and FIG. 2. Further, FIG. 3 and each other flow diagram herein illustrates an algorithm or plan that may be used as a basis for programming one or more of the functional modules of FIG. 1 and FIG. 2 that relate to the functions that are illustrated in the diagram, using a programming development environment or programming language that is deemed suitable for the task. Thus, FIG. 3 and each other flow diagram herein are intended as an illustration at the functional level at which skilled persons, in the art to which this disclosure pertains, communicate with one another to describe and implement algorithms using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs.

The algorithm or method 300 of FIG. 3 begins with step 302. At step 302, a coding computer receives a set of computer-executable rules that define assigning one or more tax codes for a first entity based on a plurality of parameters. The coding computer may be, for example, the server computer 102, and the set of computer-executable rules may be the set of rules 240 that govern the assignment of tax code(s) 218 based on parameters 230 discussed herein. The first entity may be a buyer entity 204 or a supplier entity 206. In an embodiment, the server computer 102 receives an XML file, a YAML file, a JSON file, a MessagePack file, CSV file, or any other file comprising the set of computer-executable rules 240 from a buyer computer 112 and/or a supplier computer 116, as further described herein with reference to FIG. 4. The set of computer-executable rules 240 are stored in a first digital data repository, such as database 110, in association with an entity record of the first entity. For example, a set of rules 240 that assign tax codes to invoices that are directed to a particular buyer entity 204 may be stored in database 110 in association with a buyer entity record for that particular buyer 204.

In an embodiment, once the server computer 102 receives the rules 240, the server computer 102 may process the rules 240 to minimize tax code assignment errors. For example, the server computer 102 may execute rules processing instructions 104 to evaluate the rules 240 for any missing or incorrect data that results in a tax code assignment error. In an embodiment, the server computer 102 may use the procurement system to display any applicable tax code assignment errors in a graphical user interface (GUI) associated with the buyer computer 112 and/or the supplier computer 116. In an embodiment, the server computer 102 may also cause the display of a number of times that the tax code assignment error has been repeated. In another embodiment, the server computer 102 may save the rules 240 in database 110 only in response to receiving input that corrects the tax code assignment error. In another embodiment, the server computer 102 may save the rules 240 in database 110, conditional upon correcting the tax code assignment error.

At step 304, the coding computer receives digital invoice data that defines an electronic payment invoice directed to the first entity. For example, the server computer 102 receives an electronic payment invoice 202 that features line items 208 of digital invoice data. The digital invoice data also features the first entity, which may be a supplier entity 206 or a buyer entity 204. In the example above, the server computer 102 may receive an electronic payment invoice that is directed to a particular buyer entity 204 where the invoice features a series of line items that represent goods or services. In an embodiment, the invoice 202 may be a supplier-generated invoice or a buyer-entered invoice.

At step 306, the coding computer automatically determines a commodity type 232, deductibility type 234, tax rate 236, account or cost-center, or any other features that are applicable to the invoice data. For example, the server computer 102 may determine a commodity type 232 by digitally cross-referencing line items in the invoice data that represents goods or services to community transaction data 220 that stored in database 111. The community transactional data 220 comprises a plurality of different digital line item data from different digital invoices. In an embodiment, the different digital line item data from the different digital invoices of the community transaction data 220 pertain to a plurality of other entities different from and unrelated to the first entity. For example, the community transaction data 220 may comprise line item data from invoices that are completely unrelated to the particular buyer entity 204. In another embodiment, the different digital invoices pertain to the first entity. For example, the community transaction data 220 may comprise line item data from invoices that are related directly to the particular buyer entity 204. In another embodiment, any combination of community transaction data 220 pertaining to or not pertaining to the first entity may be used to determine a commodity type 232, deductibility type 234, tax rate 236, account or cost-center, or any other features.

To determine the commodity type 232 or any other feature, the server computer 102 may use matching algorithms and techniques to cross-reference the invoice line items to the community transaction data 220. For example, the invoice data may comprise an item description 214 that the server computer 102 cross-references with the community transaction data 220. If the community transaction data 220 features a matching item description, then the server computer 102 may use the matching item description to determine the commodity type 232. The commodity type 232 may then be used in conjunction with the rules 240 to determine a tax code 218 for the invoice 202 at step 308. In another example, the invoice data may comprise a goods or services category 212 that the server computer 102 cross-references with the community transaction data 220. If the community transaction data 220 features past transactions featuring the same or similar goods and/or services, then the server computer 102 may identify the applicable deductibility type 234 based on the community transaction data 220. The deductibility type 234 may then be used in conjunction with the rules 240 to determine a tax code 218 for the invoice 202 at step 308. The same approach may be used to determine a tax rate 236, an account or cost-center, or any other feature. For example, the invoice data may comprise a supplier name while the community transaction data 220 comprises a matching supplier name. The supplier name may subsequently be used to identify certain parameters 230 that may then be used in conjunction with the rules 240 to determine a tax code 218 for the invoice 202 at step 308.

Cross-referencing may include exact matching, fuzzy matching, multiple different queries with various wildcard substitution, a trained decision tree, or any other matching techniques. In an embodiment, any type of machine learning algorithm may be used to cross-reference the invoice data to the community transaction data 220 in order to automatically determine a commodity type 232, deductibility type 234, a tax rate 236, and/or any other feature that is applicable to the invoice 202.

In an embodiment, the server computer 102 my access the community transaction data stored in database 111 and use the community transaction data as a training dataset. For example, the server computer 102 may access the training dataset for classification of commodity type and a classification of deductibility type. Different datasets for similar types of problems may be stored with data identifying the datasets. For example, a first dataset may be identified as a training dataset for classification of commodity types while a second training dataset may be identified as a training dataset for classification of deductibility types. While both datasets may include the same types of inputs and the same types of outputs, they may be stored as different datasets so that they can be used separately.

A particular input dataset and a request to run a machine learning system with the particular dataset is received at the server computer 102. For example, the server computer 102 may receive an input dataset, which comprise a plurality of inputs for which outputs are requested. The server computer 102 may also receive a request to produce one or more output datasets using the particular input dataset and the machine learning system.

The particular machine learning system is trained using the particular machine learning training dataset. For example, the server computer 102 may use the inputs and outputs of the one or more particular training datasets to compute weights for individual nodes of the particular machine learning system. The training process for a machine learning system generally comprises identifying the outputs as "correct" values for the inputs. The machine learning system then adjusts the weights of each node in order to most accurately produce the "correct" values of the outputs from the inputs. For example, the server computer 102 may use the community transaction data 220, with "correct" input values for goods, services, service exceptions, raw materials, and/or investment goods to train the machine learning system to generate a "correct" output value for commodity type 232. The same machine learning technique may be used for to automatically determine any other parameters 230.

At step 308, the coding computer automatically assigns one or more tax codes to the invoice data based on the commodity type 232 determined by the server computer 102 and the set of rules 240 that are stored in database 111 in association with the entity record. In an embodiment, the tax code 218 may be assigned to the invoice data based on the rules 240 received at the server computer 102 and the commodity type 232, deductibility type 234, tax rate 236, an account or cost-center, any other featured determined by the server computer 102, or any combination thereof.

At step 310, the server computer 102 may cause the commodity type and the one or more tax codes to be displayed in a GUI. For example, once a tax code is determined using the community transaction data 220 and the rules 240, the server computer 102 may use the procurement system to cause the commodity type 232 and the tax codes 218 to be displayed in GUI at the server computer 102, the buyer computer 112, and/or the supplier computer 116. In another embodiment, the deductibility type 234, tax rate 236, account or cost-center, or any other features determined by the server computer 102 may also be displayed.

Figure 4:
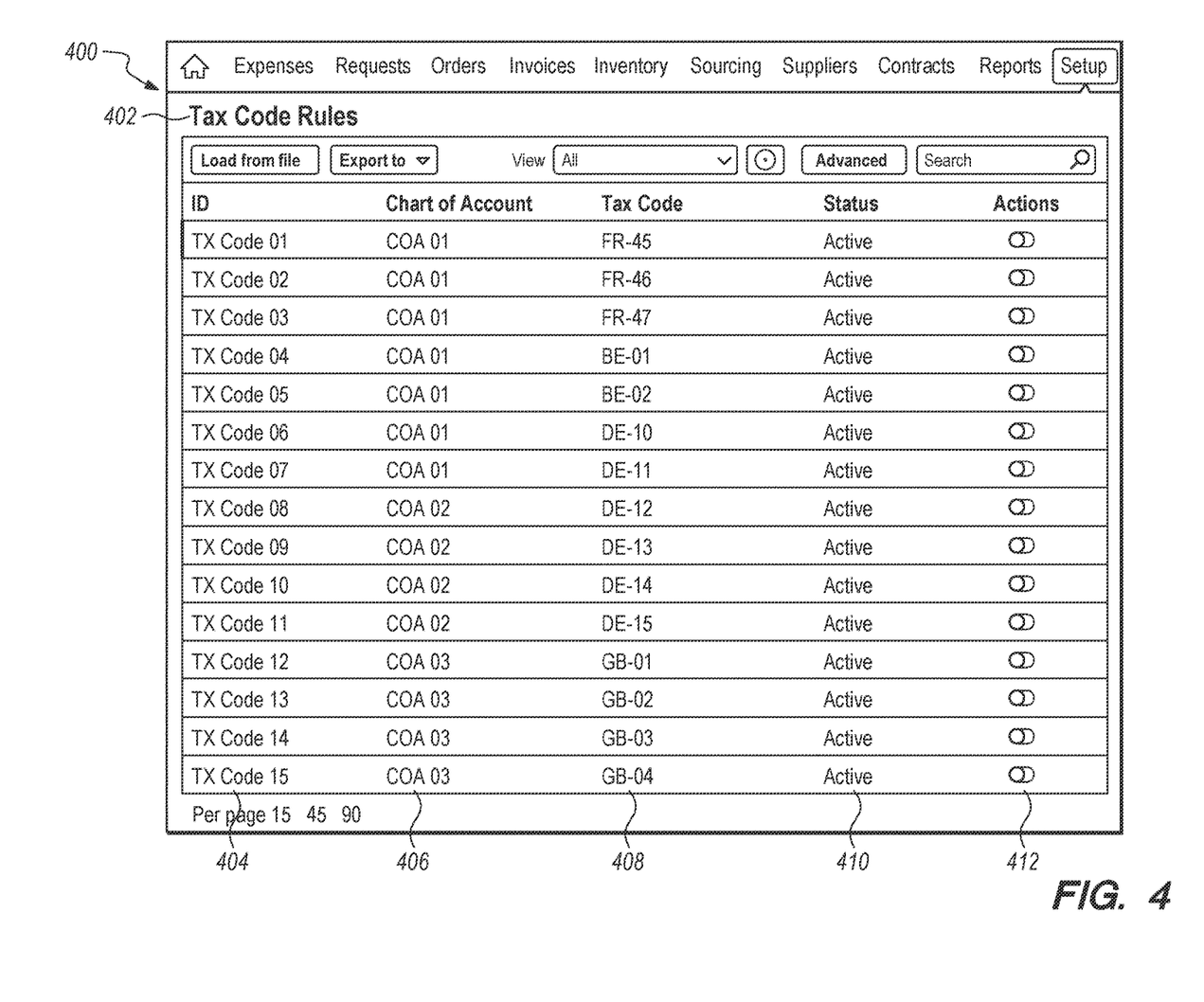
FIG. 4 depicts a portion of a computer screen display depicting a graphical user interface, in an example embodiment.

FIG. 4 depicts a portion of a computer screen display depicting a GUI 400 associated with a procurement system, in an example embodiment. The GUI 400 features a list of tax code rules 402, 240 (of FIG. 2) that include an identifier 404 for each of the tax code rules 402, a chart of account 406, an assigned tax code 408, a status 410, and actions 412 for the tax code rules 402. A user may use the GUI controls to navigate, edit, activate, or deactivate any of the tax code rules 402 listed.

Figure 5:
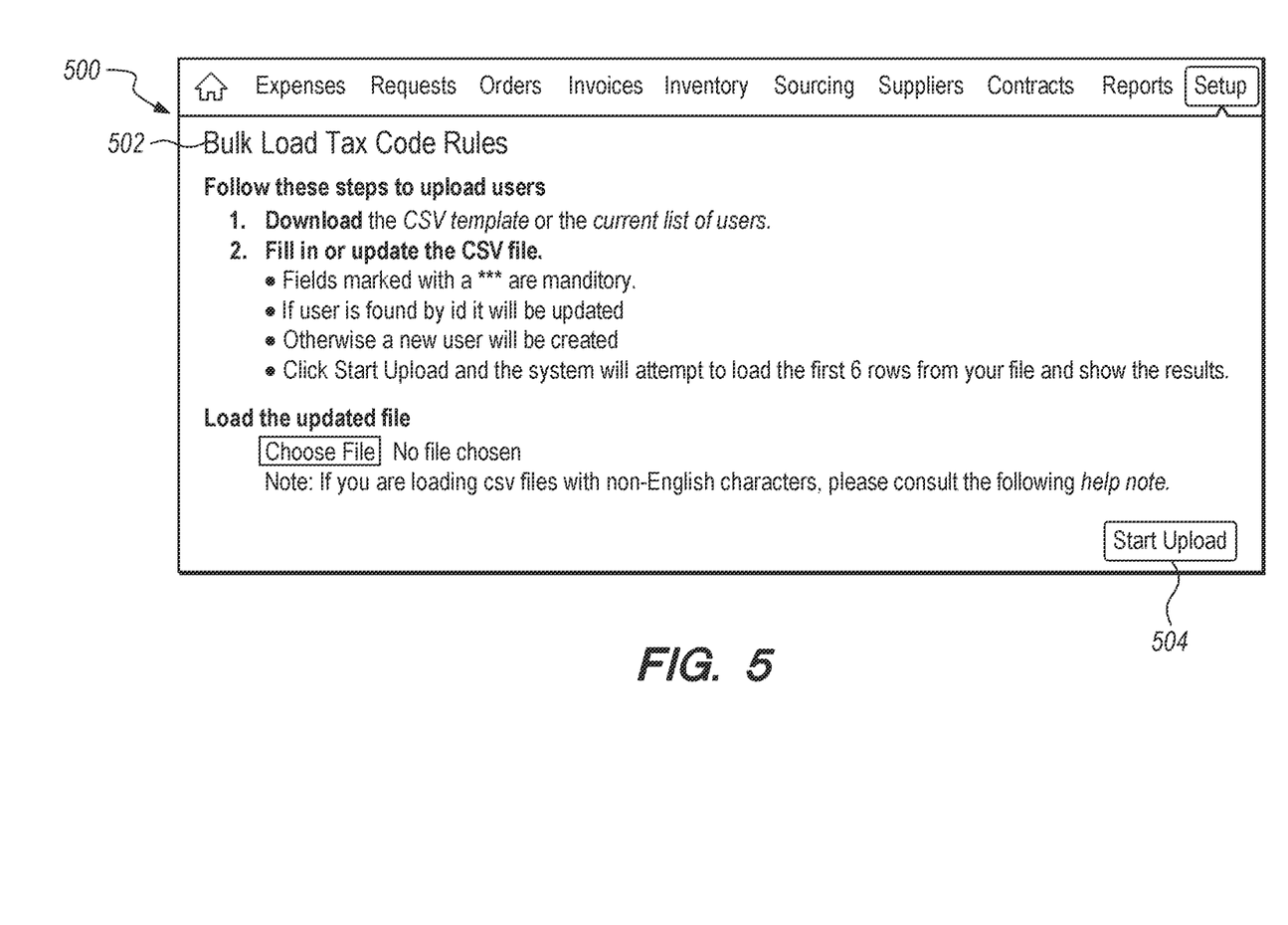
FIG. 5 depicts a portion of a computer screen display depicting a graphical user interface, in an example embodiment.

FIG. 5 depicts a portion of a computer screen display depicting a GUI 500 associated with a procurement system, in an example embodiment. The GUI 500 features an option for bulk loading 502 tax code rules. In an embodiment, users may download a CSV template, fill in the CSV template and upload the file(s) by selecting the Start Upload 504 control. For example, a supplier entity 206 may create separate CSV files for each business department and bulk upload all the tax code rules for each department. The CSV files may be saved in association with an entity record for the particular supplier entity 206 (of FIG. 2). In another embodiment, users may download an XML template, fill in the XML template and upload the file(s) by selecting the Start Upload 504 control.

Figure 6:
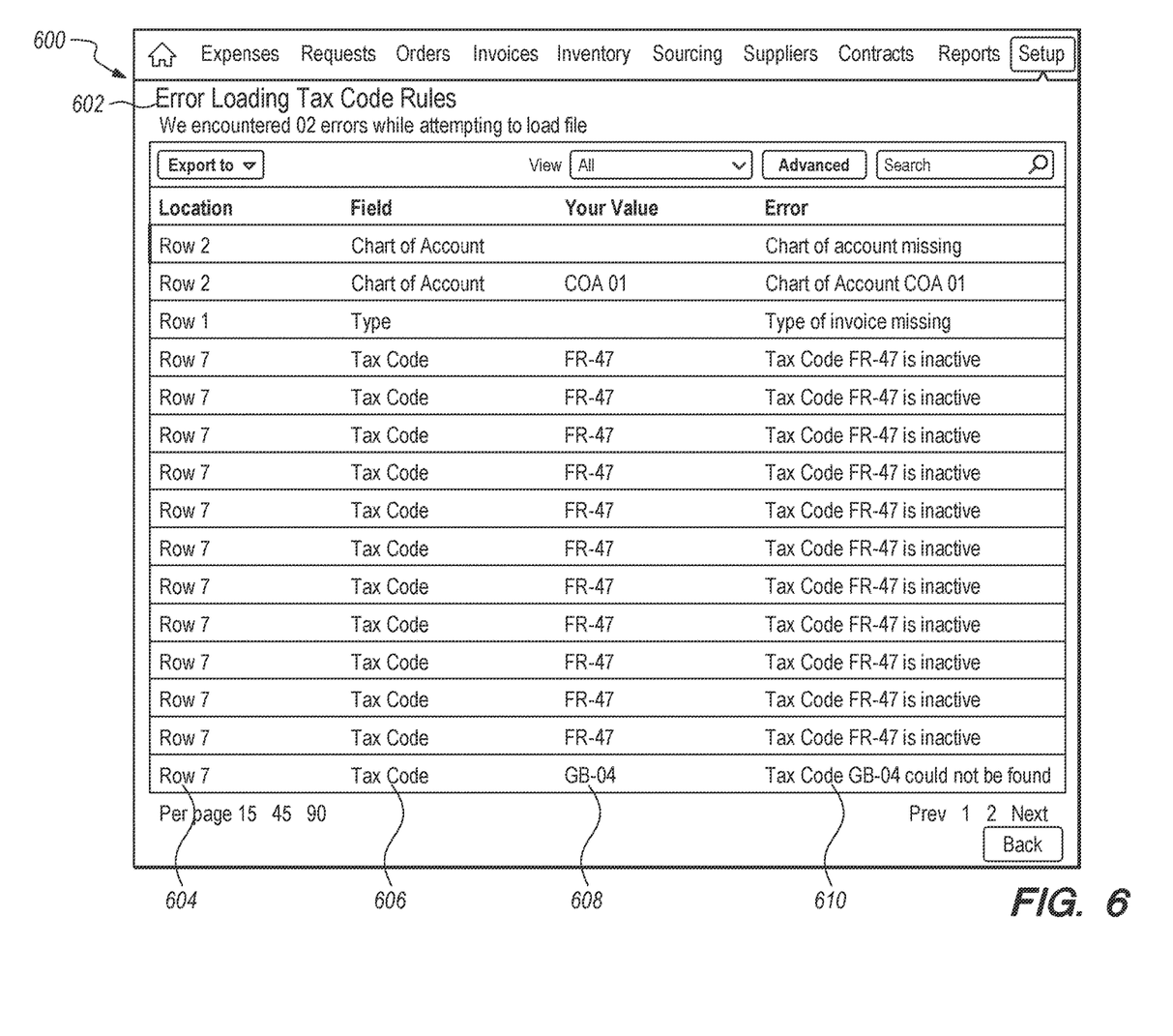
FIG. 6 depicts a portion of a computer screen display depicting a graphical user interface, in an example embodiment.

FIG. 6 depicts a portion of a computer screen display depicting a GUI 600 associated with a procurement system, in an example embodiment. The GUI 600 features a list of errors 602 in loading tax code rules. The error list may include a location 604 of the error, a field 606 associated with the error, a value 608 that is associated with the field 606, and an error description 610. In an embodiment, the procurement system may not allow the rules 240 (of FIG. 2) to be saved until all errors have been corrected.

Using the foregoing techniques, programmed computers may use a distributed system to transfer, store, monitor, and apply a set of rules to invoices using community transaction data to automatically determine certain parameters and automatically assign tax codes. Previous approaches involved repeatedly obtaining the same data, resulting in excessive and wasteful use of processing resources such as CPU cycles, memory, and network bandwidth. However, the present approach uses machine learning in association with tax code assignment rules to reduce the duplication of efforts and decrease the use of computer resources, thus improving overall procurement computing system efficiency.

5.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
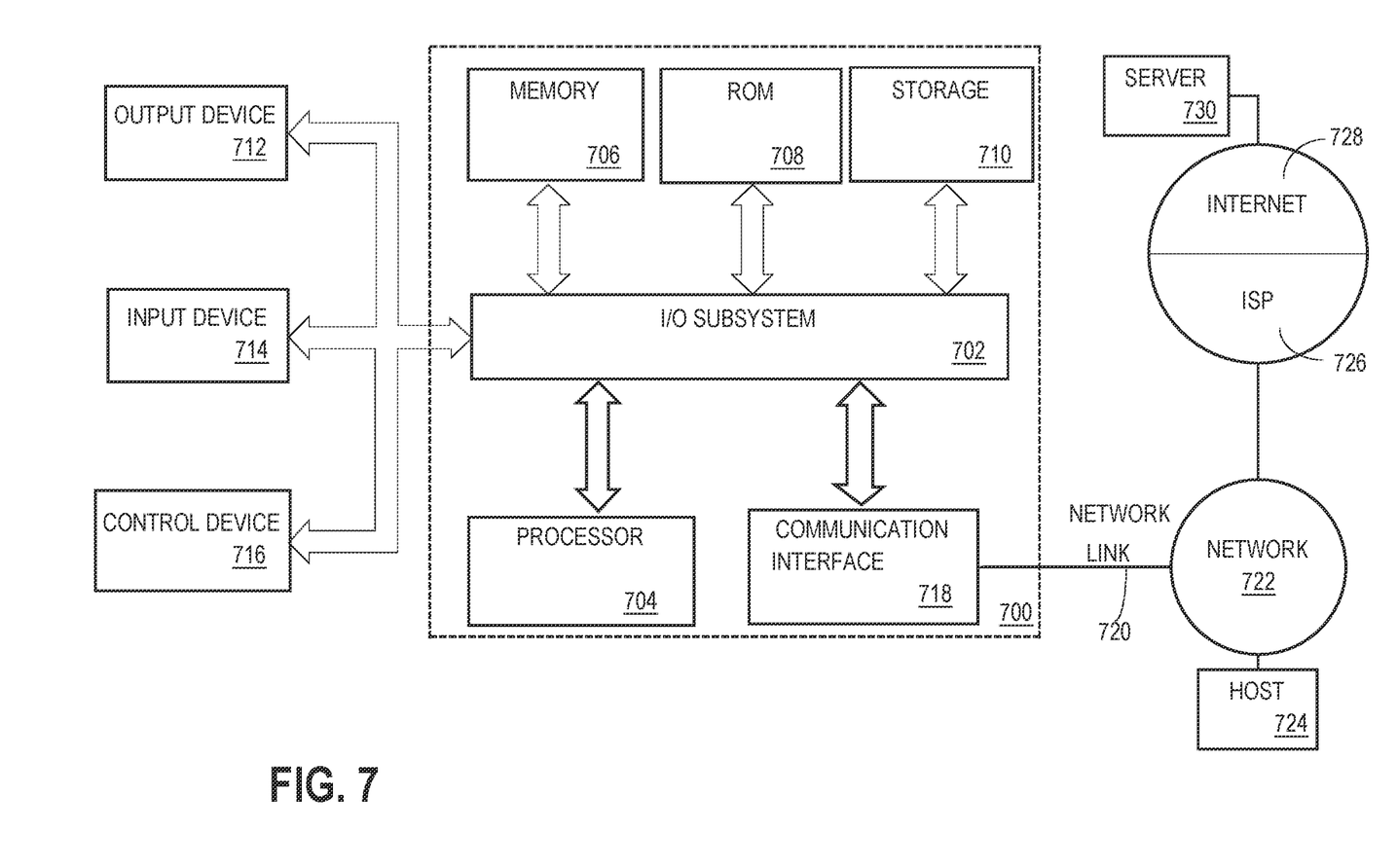
FIG. 7 is a block diagram that illustrates a computer system upon which an embodiment of the invention may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device.

An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method for improving computer processing efficiency, comprising:

using a coding computer comprising at least one processor and a computer-readable storage medium storing sequences of rules processing instructions, parameter generating instructions, and tax code assignment instructions, executing the rules processing instructions to cause retrieving, at the coding computer, a set of computer-executable rules that define assigning one or more tax codes for a first entity based on a plurality of parameters, and electronically storing the set of rules as one of an XML file, YAML file, JSON file, Message-Pack file, or CSV file, in a digital data repository;

executing by the at least one processor the parameter generating instructions to cause receiving from a buyer computer, at the coding computer, digital invoice data that defines an electronic payment invoice directed to the first entity;

executing by the at least one processor, at the coding computer, the parameter generating instructions that are programmed to automatically determine one or more commodity types applicable to the invoice data by digitally cross-referencing line items in the invoice data representing goods or services to community transaction data using a machine learning algorithm;

using the coding computer, executing by the at least one processor the tax code assignment instructions to cause the at least one processor to automatically assign one or more tax codes to the invoice data based on the one or more commodity types and the set of computer-executable rules that are stored in the digital data repository; and causing to display the one or more commodity types and the one or more tax codes in a graphical user interface.

2. The method of claim 1, further comprising:

using the coding computer, determining a deductibility type for the invoice data by cross referencing the invoice data with community transaction data; and wherein automatically assigning one or more tax codes further comprises using the deductibility type.

3. The method of claim 1, wherein the invoice data comprises an item description and a supplier name, and wherein the community transaction data comprises a respectively matching item description and the supplier name.

4. The method of claim 1, wherein the machine learning algorithm comprises any one of a trained decision tree, fuzzy matching, and a plurality of queries with wildcard substitution, the community transaction data comprising a plurality of different digital line item data for different digital invoices of a plurality of other entities different from and unrelated to the first entity.

5. The method of claim 1, further comprising:

in response to receiving the set of computer-executable rules, determining a tax code assignment error and causing to display the tax code assignment error in the graphical user interface; and saving the set of computer-executable rules in a first digital data repository only in response to receiving input correcting the tax code assignment error.

6. The method of claim 1, further comprising:

in response to receiving the set of computer-executable rules, determining a tax code assignment error; and in response to determining the tax code assignment error, causing to display in the graphical user interface, the tax code assignment error and a number of times the tax code assignment error has been repeated.

7. The method of claim 1, wherein the plurality of parameters comprises at least one of: a supplier tax country value, a buyer tax country value, an invoice origination country value, and a billing destination country value; and
wherein automatically assigning the one or more tax codes to the electronic payment invoice using the commodity type and the set of computer-executable rules comprises determining a jurisdiction using the set of computer-executable rules based on at least one of: the supplier tax country value, the buyer tax country value, the invoice origination country value, and the billing destination country value.

8. One or more non-transitory computer-readable media storing instructions which, when processed by one or more processors, cause:
storing, by at least one processor of a coding computer, sequences of rules processing instructions, parameter generating instructions, and tax code assignment instructions;
executing, by the at least one processor, the rules processing instructions to cause receiving a set of rules for assigning one or more tax codes for an entity based on a plurality of parameters, and electronically storing the set of rules as one of an XML file, YAML file, JSON file, MessagePack file, or CSV file, in a digital data repository;
executing, by the at least one processor, the parameter generating instructions to cause receiving from a buyer computer an invoice for the entity wherein the invoice comprises invoice data;
determining, by the at least one processor, one or more commodity types for the invoice by digitally cross-referencing the invoice data with community transaction data using a machine learning algorithm; and
executing, by the at least one processor, the tax code assignment instructions to cause the at least one processor to automatically assign one or more tax codes to the invoice using the one or more commodity types and the set of rules stored in the digital data repository and causing to display the one or more tax codes in a graphical user interface.

9. The one or more non-transitory computer-readable media of claim 8, further comprising additional instructions which, when processed by the one or more processors, cause:
determining a deductibility type for the invoice by cross referencing the invoice data with community transaction data that is stored in a second data repository; and
wherein automatically assigning one or more tax codes further comprises using the deductibility type.

10. The one or more non-transitory computer-readable media of claim 8, wherein the invoice data comprises an item description and a supplier name, and wherein the community transaction data comprises a respectively matching item description and the supplier name.

11. The one or more non-transitory computer-readable media of claim 8, wherein the machine learning algorithm comprises any one of a trained decision tree, fuzzy matching, and a plurality of queries with wildcard substitution.

12. The one or more non-transitory computer-readable media of claim 8, further comprising additional instructions which, when processed by the one or more processors, cause:
in response to receiving the set of rules, determining a tax code assignment error and causing to display the tax code assignment error in the graphical user interface; and wherein saving the set of rules in a first data repository is conditional upon correcting the tax code assignment error.

13. The one or more non-transitory computer-readable media of claim 8, further comprising additional instructions which, when processed by the one or more processors, cause:
in response to receiving the set of rules, determining a tax code assignment error; and
in response to determining the tax code assignment error, causing to display in the graphical user interface, the tax code assignment error and a number of times the tax code assignment error has been repeated.

14. The one or more non-transitory computer-readable media of claim 8, wherein the plurality of parameters comprises at least one of: a supplier tax country value, a buyer tax country value, an invoice origination country value, and a billing destination country value; and
wherein automatically assigning the one or more tax codes to the invoice using the commodity type and the set of rules comprises determining a jurisdiction using the set of rules based on at least one of: the supplier tax country value, the buyer tax country value, the invoice origination country value, and the billing destination country value.

15. A computer system comprising:
one or more processors; and
one or more memories communicatively coupled to the one or more processors and storing instructions which, when processed by the one or more processors of a server computing device, cause:
storing sequences of rules processing instructions, parameter generating instructions, tax code assignment instructions, and display instructions;
executing, by the one or more processors the rules processing instructions to cause receiving a set of rules for assigning one or more tax codes for an entity based on a plurality of parameters, and electronically storing the set of rules as one of an XML file, YAML file, JSON file, MessagePack file, or CSV file, in a digital repository;
executing, by the one or more processors the parameter generating instructions to cause receiving, from a buyer computer an invoice for the entity wherein the invoice comprises invoice data;
determining, by the one or more processors one or more commodity types for the invoice by digitally cross-referencing the invoice data with community transaction data that is stored in a separate data repository using a machine learning algorithm; and
executing, by the one or more processors the tax code assignment instructions to cause automatically assigning one or more tax codes to the invoice using the one or more commodity types and the set of rules and causing to display the one or more tax codes in a graphical user interface.

16. The computer system of claim 15, wherein the one or more memories stores additional instructions which, when processed by the one or more processors of the server computing device, cause:
determining a deductibility type for the invoice by cross referencing the invoice data with community transaction data stored in the separate data repository; and
wherein automatically assigning one or more tax codes further comprises using the deductibility type.

17. The computer system of claim 15, wherein the invoice data comprises an item description and a supplier name, and wherein the community transaction data comprises a respectively matching item description and the supplier name.

18. The computer system of claim 15, wherein the machine learning algorithm comprises any one of a trained decision tree, fuzzy matching, and a plurality of queries with wildcard substitution.

19. The computer system of claim 15, wherein the one or more memories stores additional instructions which, when processed by the one or more processors of the server computing device, cause:
   in response to receiving the set of rules, determining a tax code assignment error and causing to display the tax code assignment error and a number of times the tax code assignment error has been repeated in the graphical user interface; and
   wherein saving the set of rules in a first data repository is conditional upon correcting the tax code assignment error.

20. The computer system of claim 15, wherein the plurality of parameters comprises at least one of: a supplier tax country value, a buyer tax country value, an invoice origination country value, and a billing destination country value; and
   wherein automatically assigning the one or more tax codes to the invoice using the commodity type and the set of rules comprises determining a jurisdiction using the set of rules based on at least one of: the supplier tax country value, the buyer tax country value, the invoice origination country value, and the billing destination country value.

* * * * *